United States Patent [19]

Marceau et al.

[11] Patent Number: 5,566,085
[45] Date of Patent: Oct. 15, 1996

[54] STABILITY TRANSFER LIMIT CALCULATION IN A POWER TRANSMISSION NETWORK

[75] Inventors: Richard J. Marceau, Outremont; Francisco D. Galiana, St. Lambert; Richard Mailhot, Montreal, all of Canada

[73] Assignee: Hydro-Quebec, Quebec, Canada

[21] Appl. No.: 337,019

[22] Filed: Nov. 7, 1994

Related U.S. Application Data

[63] Continuation-in-part of Ser. No. 950,123, Sep. 24, 1992, abandoned.

[51] Int. Cl.$^6$ .................................................. H02J 3/04
[52] U.S. Cl. ........................... 364/492; 364/483; 364/495; 364/578; 364/102; 307/102
[58] Field of Search .................................. 364/480, 481, 364/483, 492, 495, 578, 802; 361/62, 65, 78–80; 322/58; 323/205; 324/522; 327/379, 538, 540; 307/11, 31, 82, 102, 105

[56] References Cited

U.S. PATENT DOCUMENTS

| | | |
|---|---|---|
| 3,789,201 | 1/1974 | Carpenter et al. . |
| 3,808,409 | 4/1974 | Enns et al. . |
| 3,825,732 | 7/1974 | Haley et al. . |
| 3,832,533 | 8/1974 | Carlson et al. . |
| 3,857,027 | 12/1974 | Carlson et al. . |
| 4,974,140 | 11/1990 | Iba et al. ................................. 364/492 |
| 5,227,983 | 7/1993 | Cox et al. . |
| 5,262,960 | 11/1993 | Said et al. . |
| 5,323,330 | 6/1994 | Asplund et al. ......................... 364/492 |

OTHER PUBLICATIONS

Symposium on Expert Systems Applications to Power Systems, Aug. 22–26, 1988, L. Wehenkel, "Artificial Intelligence Methods for On–Line Transient Stability Assessment of Electric Power Systems", 7 pages.

IEEE Transactions on Power Systems, vol. 4, No. 2, May 1989, pp. 789–800, L. Wehenkel, et al., "An Artificial Intelligence Framework for On–Line Transient Stability Assessment of Power Systems".

Symposium on Expert Systems Application to Power Systems, Aug. 22–26, 1988, Yusheng Xue, "Preliminary Design of a Hybrid System for Transient Security Analyses of Power Systems", pp. 5–16 to 5–21.

(List continued on next page.)

*Primary Examiner*—James P. Trammell
*Assistant Examiner*—Craig Steven Miller
*Attorney, Agent, or Firm*—Oblon, Spivak, McClelland, Maier & Neustadt, P.C.

[57] ABSTRACT

A transient or voltage stability transfer limit is calculated for a power network having at least two independent AC generators supplying a common load via separate AC transmission lines having at least one bus. Steady state values for variable characteristic electrical parameters of variable elements of the network are determined based on particular values for power transferred by the transmission lines. Static values for passive characteristic electrical parameters of passive conductive elements of the network are determined. A contingency resulting in a sudden change of at least one of the variable electrical parameters and the passive electrical parameters is selected. A post contingency steady state value for a voltage at one of the buses is calculated. A voltage over time during a transition period at the bus is calculated, the transition period extending in time from a start of the contingency through a discontinuity during which the voltage is abnormally altered, and recovery during which the voltage will tend toward a steady state terminal value. An integral sum of squares of a difference between the post contingency steady state voltage and the transition period voltage over the transition period is calculated to obtain an energy value. Using two such energy values from two power values, a transfer limit estimate for the transmission line is obtained as being an asymptote of the energy values, the energy values being an inverse function of the stability limit less the power value.

12 Claims, 7 Drawing Sheets

OTHER PUBLICATIONS

Second Symposium on Expert Systems Applications to Power Systems, Jul. 17–20, 1989, Y. Akimoto, et al., "Application of Expert Systems to Transient Stability Studies", 7 pages.

Proceedings of the IEEE, vol. 80, No. 5, May 1992, pp. 712–725, Francisco D. Galiana, et al., "Expert Systems in Transmission Planning".

"A Guide to Expert Systems", 1986, pp. 70–77, Donald A. Waterman.

IEEE Transactions on Power Systems, vol. 9, No. 2, May 1994, pp. 764–771, Richard J. Marceau, et al., "Fourier Methods for Estimating Power System Stability Limits".

"Mechanizing Dynamic Security Analysis", Sep. 1993, Richard J. Marceau, the whole book.

FIG_1

STABILITY TRANSFER LIMIT CALCULATION IN A POWER TRANSMISSION NETWORK

This application is a continuation-in-part application of U.S. patent application Ser. No. 950,123 filed Sep. 24, 1992 now abandoned.

FIELD OF THE INVENTION

The present invention relates to the calculation of stability power transfer limits in AC power transmission systems for use in operations and system planning of the power system.

DESCRIPTION OF THE PRIOR ART

Dynamic security characterizes a powersystem's ability to withstand disturbances and ensure continuity of service. For example, in operations planning, dynamic security analysis encompasses a large class of problems, such as finding the security status of a network, the power transfer limit in a transmission corridor, the worst contingency in some area, or performing some complex sensitivity analysis. In practice, dynamic security is often measured in terms of a dynamic security limit, defined as the maximum power transfer for which the network can not only serve the worst possible normal contingency but also guarantee an acceptable level of service quality without loss of load.

A stability transfer limit is the maximum power transmission level at which, for a given contingency, the AC power transmission system is stable. A contingency is a disruption in the transmission system such as a single-line to ground fault (SLGF), loss of a transmission line, or the like and can involve a combination of disturbances such as a fault with loss of line (e.g. disjunction after a fault). The dynamic security power limit is an arbitrary power transmission level for a network, or part of a network, which is decided to be a safe level. It is therefore a power level that is safely or conservatively below the lowest or "worst" stability transfer limit for all probable contingencies in the network or part thereof.

The determination of stability transfer limits is an important part of dynamic security analysis. The latter aims at specifying safe pre-contingency power levels in transmission corridors according to some criterion- On many networks, transient stability is the criterion which determines the most constraining power transfer limits though voltage stability is also an important criterion on many other networks. The dynamic security limit of a corridor is the lowest power transfer limit for several contingency locations with respect to either criterion. For example, on a transient-stability-limited power system, the transient stability transfer limit for a given location is obtained from off-line network simulations of some predetermined contingency at different power levels. In such a system, the transient stability transfer limit is lower (i.e. more restrictive) than the voltage stability transfer limit. The transient stability transfer limit is the highest acceptable power transfer which respects acceptable post-contingency voltage or frequency criteria. It follows that the determination of transient stability transfer limits (or voltage stability transfer limits using long-term stability simulations, among others) constitutes an essential step in the determination of dynamic security limits.

Dynamic security analysis is dominated by the use of algorithmic software for off-line evaluation and control of load-flow, transient-stability, voltage-stability and other network characteristics. But even though simulations are readily performed, assessing and ensuring dynamic security across all possible topologies and contingencies remains a formidable challenge.

The prior art stability analysis computing systems typically involve complex simulation calculations and require significant amounts of computer processing time to produce results. One method for obtaining a rapid estimate of the transient stability transfer limit in a simulated power system is set out in a paper co-authored by the Applicants of the present application entitled "Fourier Methods for Estimating Power System Stability Limit" presented at the IEEE PICA Conference in Phoenix, Ariz. in May 1993. In the mentioned paper, it is proposed to predict the transient stability limit of power transfer in a power system undergoing a six-cycle three-phase fault at a point in the power network (with no subsequent change in topology) by calculating an energy of the voltage signal relative to an initial value base line. It is disclosed in the paper that the energy value is an inverse function proceeding asymptotically towards the transient stability power limit as a function of the power transfer level. Therefore, instead of determining the transient stability transfer limit by numerous transient stability simulations, two such transient stability simulations at two different power levels and two calculations of the signal energy level for stable simulations will provide two points on the inverse relationship curve in order to predict with reasonable accuracy the power transfer limit. The paper only considers the contingency of a three-phase fault without loss of line in which the energy calculation can accurately be made assuming an initial value base line. This type of contingency is however unimportant from the perspective of dynamic security analysis since normal contingencies (i.e. fault with additional loss of an important power system element) are essential to determine dynamic security limits.

SUMMARY OF INVENTION

In accordance with one aspect of the present invention, there is provided a method for calculating a stability transfer limit in a power network, the network having at least two independent AC generators supplying a common load via separate AC transmission lines having at least one bus, "bus" being a term equivalent in this context to the terms "node" or "station", the method comprising the steps of:

a) determining steady state values for variable characteristic electrical parameters of elements of the network based on particular values for power transferred by one of the transmission lines;

b) determining static values for passive characteristic electrical parameters of passive conductive elements of the network;

c) selecting a contingency resulting in a sudden change of at least one of the variable electrical parameters and the passive electrical parameters;

d) calculating using the steady state and the static values a post contingency steady state value for a voltage at one of the at least one bus;

e) calculating using the steady state and the static values a voltage over time during a transition period at the one of the at least one bus, the transition period extending in time from a start of the contingency through a discontinuity during which the voltage at the one bus is abnormally altered, and recovery during which the voltage at the one bus will tend toward a steady state terminal value;

f) calculating an integral sum of squares of a difference between the post contingency steady state voltage and the transition period voltage over the transition period to obtain a voltage signal energy value;

g) changing one of the power values associated with one of the AC transmission lines and repeating the steps a) b) d) e) and f) to obtain two signal energy values, the two signal energy values being non-substantially-infinite;

h) obtaining the transient stability transfer limit for the one transmission line and one contingency location as being an asymptote of the signal energy values, the signal energy values being an inverse function of the limit less the one power value.

Preferably, the method additionally comprises the steps of:

calculating a slope value as a function of the two signal energy values and the two corresponding power values; and if the slope value is determined to be below a predetermined value repeating the steps a) b) d) e) and f) using as the one power value a value near the obtained stability limit to obtain a third energy value; and repeating step h) using additionally the third energy value to obtain a higher accuracy estimate of the stability limit.

The invention also provides a method for calculating the transient stability transfer limit comprising the steps of:

a) determining steady state values for variable characteristic electrical parameters of elements of the network based on particular values for power transferred by one of the transmission lines;

b) determining static values for characteristic electrical parameters of passive conductive elements of the network;

c) selecting a contingency resulting in a sudden change of at least one of the variable electrical parameters and the passive electrical parameters;

d) calculating using the steady state and the static values a voltage over time during a transition period at one of the at least one bus, the transition period extending in time from a start of the contingency through a discontinuity during which the voltage at the one bus is abnormally altered, and recovery during which the voltage at the one bus will tend toward a steady state terminal value; and e) changing one of the power values associated with the one of the transmission lines and repeating the steps a) and d) to determine within a predetermined degree of accuracy a maximum value for power generated at the one of the transmission lines resulting in a stable value of the terminal value, whereby the stability limit is calculated to be the maximum value.

Preferably, in the case where the contingency is a three-phase fault resulting in loss of line in a given one of the AC transmission lines, the transition period comprises sub-periods of fault of the given one transmission line during which the given one transmission line provides a low resistance current path to ground, disjunction during which the one given line is disconnected from the group of transmission lines and the low resistance path is removed, and recovery during which the voltage at the one bus node will tend towards a steady-state terminal value. To determine the dynamic security limit of a line, or of a group of lines in parallel with intermediate stations, called a corridor, in a stability-limited power system, the method according to the invention preferably further comprises steps of:

f) storing the maximum value for the contingency;

g) changing the contingency to be of a different given one of a group of the AC transmission lines;

h) repeating steps d) and e); and i) repeating steps f) through h) to determine a lowest one of the maximum values for the group, whereby the security limit for the group of AC transmission lines (i.e. a transmission corridor) is the lowest transfer limit.

When determining stability at a given power transfer level, a parameter is the duration of the stability analysis. For transient stability analysis, the duration of the simulation need only be about 10 seconds, i.e. 600 cycles. If the result indicates stability, no knowledge is however obtained as to subsequent stability. When a contingency changes the topology of a power network, both the ability of the network to "absorb" the change in the first few seconds (i.e. less than 600 cycles) and the ability for the changed topology to continue supplying power under the new conditions at least for the first few minutes (e.g. 5 minutes), need to be checked. The latter can be done, among other ways, using long-term transient stability simulations. Typically, when a contingency results in a loss of line and therefore increased flow over other lines in the network, the simulation is used to determine whether the remaining lines can adjust to the new transfer levels. The present invention can be used for both transient stability limit determination and for long term voltage stability limit determination. In general, networks can be transient-stability limited, voltage stability limited, or both, depending on where the contingency occurs and which transmission corridor is involved. For example, it may happen that, in some power systems, certain corridors are transient-stability-limited, meaning that the dynamic security limit of said corridors depend on transient stability criteria, whereas other corridors are voltage-stability-limited, meaning that the dynamic security limit of the latter corridors depends on voltage stability criteria. When determining the voltage stability limit using the signal energy value, the duration of the voltage simulation is the same for the two (or three) energy value calculations and the steady state voltage to be subtracted is the voltage attained at the end of the stable simulation.

BRIEF DESCRIPTION OF THE DRAWINGS

The invention will be better understood by an examination of the following description, together with the accompanying drawings in which:

FIG. 3 illustrates the variation of power transfer limits on the illustrated system as a function of fault location; FIG. 3 also shows the dynamic security limit which results from this pattern of transfer limits;

DETAILED DESCRIPTION OF PREFERRED EMBODIMENTS

Figure 1:
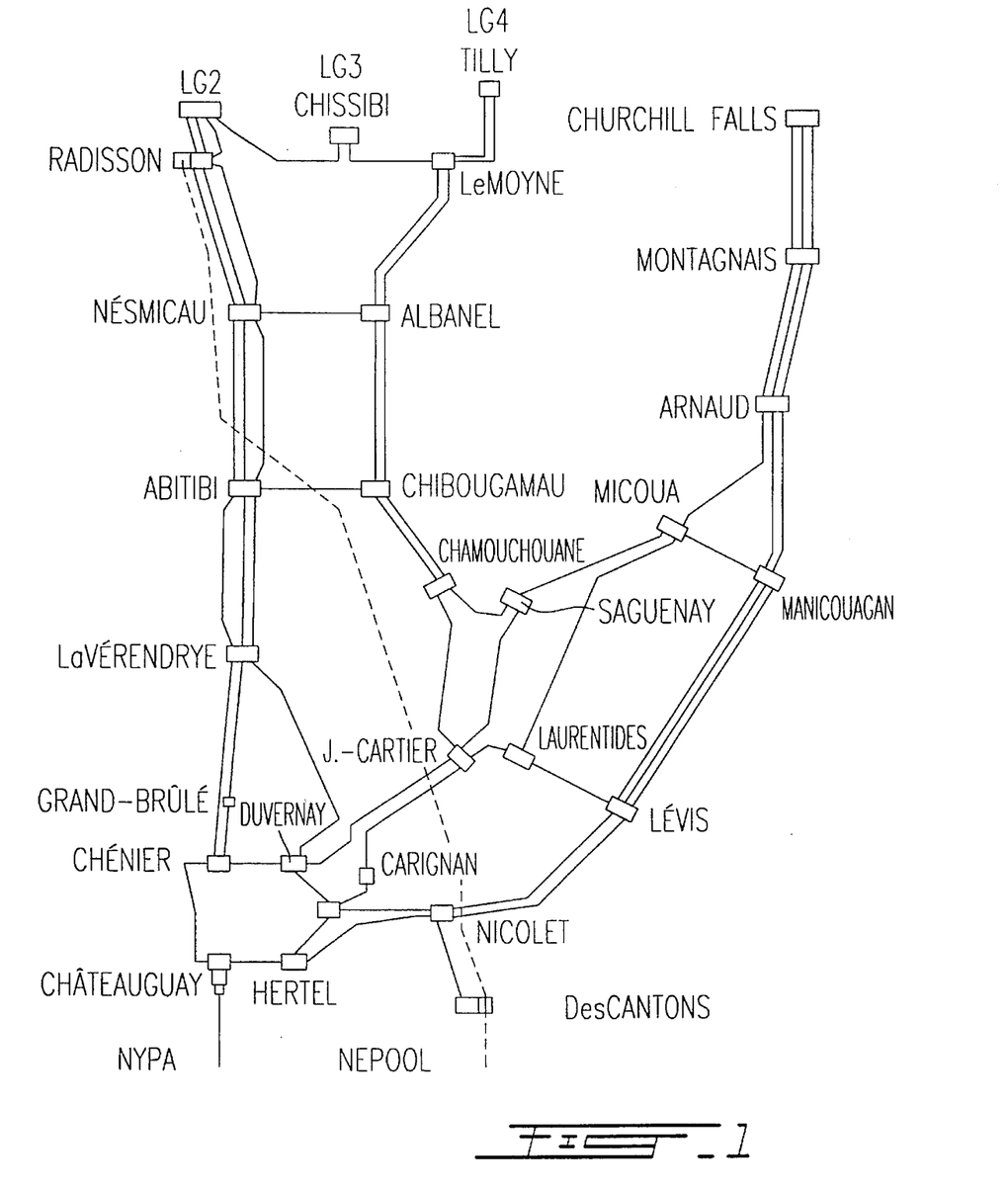
FIG. 1 is an illustration of a Hydro-Quebec 735 kv transmission system.

FIG. 1 illustrates the Hydro-Québec 735 kV AC power transmission system. This extra high voltage (EHV) power transmission network has a plurality of high power hydroelectric AC generators connected to a network of AC lines feeding electricity to consumers in Quebec and also in the United States and Ontario. The power network illustrated has a plurality of power stations at each node labelled by their geographical names within Quebec. Each node or station may be connected to a generator or to a load. For example, Churchill Falls is a node to which the power generated at the Churchill Falls hydroelectric plant is connected, and the Lévis station is connected to the load of the Quebec City region. Other power generating stations are also provided in the network, and for example, one supplies electricity to the network at the LG 4 (Tilly) node. A load connected to the Lévis node draws power from more than one power generating station as a result of the interconnections in the network. Dynamic security analysis relates to determining the amount of power that can be transferred along the AC transmission lines from a plurality of generators to at least one common load in the network in a safe and secure manner. Security is accepted in the art to mean that, if an accident happens at some point along the transmission network, the generators will remain synchronized and continue to supply power in a stable fashion (i.e. transient stability) and power system voltage recovers and stabilizes to an acceptable post contingency steady-state value (i.e. voltage stability). The power distribution system includes controls which are designed to keep the generators in sync with one another (i.e. transient stability) in order to ensure efficient operation and ensure appropriate voltage control (i.e. voltage stability). If, for any reason, the generators go out of sync, or if the steady-state voltage collapses from attempting to transmit too much power in steady-state, the network will be unable to transmit power to the load and the unstable system will need to be shut down. Shutting down the generators and then bringing them back up to speed in sync with one another involves a temporary blackout.

When a breakdown in the transmission system occurs, the sharp and significant change in load on the generators results in throwing off of one generator with respect to another. For example, if a fault occurs in the transmission lines interconnecting the Montagnais and Arnaud stations illustrated in FIG. 1, the generators at Churchill Falls will see a low resistance path to ground. This low resistance and increase in current will allow the AC generators to accelerate somewhat in speed. When the network detects the line fault, the faulty line is disconnected from the system and power is allowed to be conducted over the remaining transmission lines forming the bus or link between the stations. At this point, the generators at Churchill Falls would have been given a jolt which would have been far less perceptible to the generator connected at Tilly. It is now up to the control system to resynchronize all generators in the power distribution system. The question is whether the fault and subsequent disjunction or loss in the transmission line (the contingency) has created a condition which will lead towards a transiently stable continuing terminal value or whether the discrepancy traded is insurmountable and whether the generators will ultimately move out of sync requiring a shutdown of the network.

The dynamic security limit for a group of AC transmission lines in a power network is the conservative maximum amount of power which can be transmitted along the group of AC transmission lines connecting two nodes in the network when other generators and loads connected to the network are at predetermined values and at which power level any normal contingency can take place without causing the generators in the system to move irreparably out of sync or cause system voltage to collapse slowly in quasi-steady state after the contingency has occurred. The contingency can be a line fault, disjunction or loss of the line including a physical break in the conductor, or both.

The response of the system to the contingency is simulated at a number of different power values for transmission in the network. Power transmission values in every link of the power distribution network affect to a greater or lesser degree the transient or voltage stability of the whole network since all transmission lines are interconnected. Let us consider the case of transient stability analysis. The simulation typically calculates the voltage (AC RMS voltage) at a given point in the network over a relatively short period of time (for a few seconds to half a minute) to see whether the disturbance caused by the contingency is compensated for and a new stable transmission power level is attained or whether the result is instability. If there is instability between two generators in the network, the drop in voltage level can be efficiently measured at most any point within the network, however, it is typically measured or simulated for a point relatively near the contingency.

Figure 2:
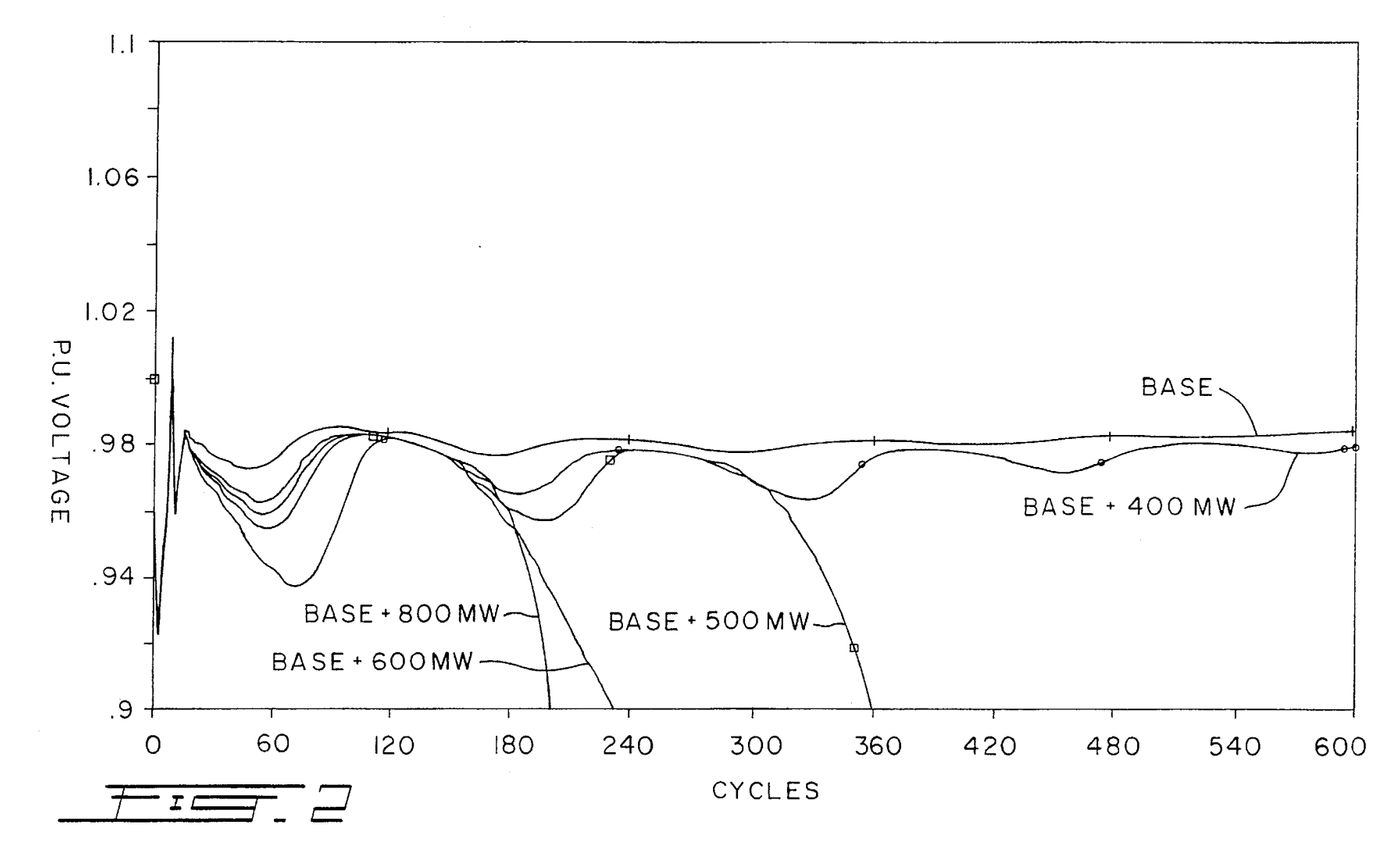
FIG. 2 illustrates the transient RMS voltage behaviour at Duvernay for a line fault with loss of line between Chamouchouane and Jacques-Cartier.
Figure 3:
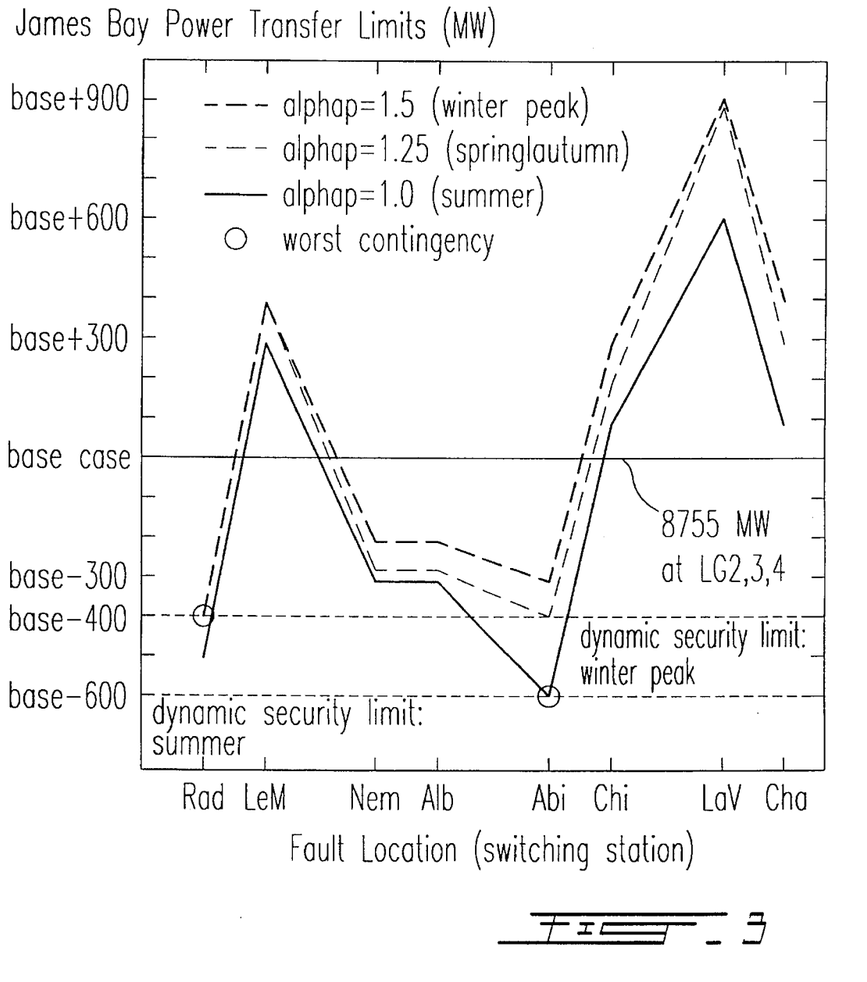

FIG. 2 is a graph illustrating the voltage at the Duvernay station when there is a single-line to ground fault and subsequent loss of line (disjunction) between the Chamouchouane and Jacques-Cartier (J-Cartier) stations. The RMS voltage is expressed in relative units. As illustrated, the fault results in the positive-sequence RMS voltage dipping instantaneously to about 92% of its normal value after which the line is lost and the voltage then surges back within about 1% of its normal value. The system response is simulated and followed over time. FIG. 2 shows the voltage at the Duvernay station when the power being generated by the group of generators of the James Bay power system, namely those connected to the nodes labelled as LG 2, LG 3 and LG 4, are varied by four various increased levels of power generation. As these power levels are increased in the model of the transmission system, either the load is increased over the entire network, or generation at other hydroelectric stations is reduced while the load is maintained constant, or a mixture of the two is possible.

As shown in FIG. 2, the calculated voltage at the Duvernay station is stable when the power level is increased by 400 MW above a nominal base level of power generation. If the power level is 500 MW above the base level, the voltage at the Duvernay station drops unrecoverably below 90% of its usual voltage after 360 cycles (6 seconds). As can be understood, the loss of a line such as the loss of the line between Chamouchouane and Jacques-Cartier, changes the topology of the transmission system, that is, the power transmission capacity of the bus between the Chamouchouane and Jacques-Cartier stations will be reduced if a line is lost. If the entire bus is lost, power from Chamouchouane to Jacques-Cartier would need to pass principally first to the Saguenay station and then to the Jacques-Cartier station.

As can be appreciated, a computer simulation of power flow in such an extensive power transmission network is complex and lengthy to execute. Steady-state power flow calculation programs are known in the art which are able to give values for the power flows along all AC transmission lines in a network based on the values of the passive electrical suitable elements in the network as well as active electrical elements in the network. A load flow simulation program developed by Hydro-Québec is RP600. Transient stability calculation programs able to calculate transient voltage values as illustrated in FIG. 2 are also known in the art. The power levels of the load or loads and generators are considered variable elements in the system since they may change over time. A suitable transient voltage simulation program is Hydro-Quebec's ST600.

Figure 4:
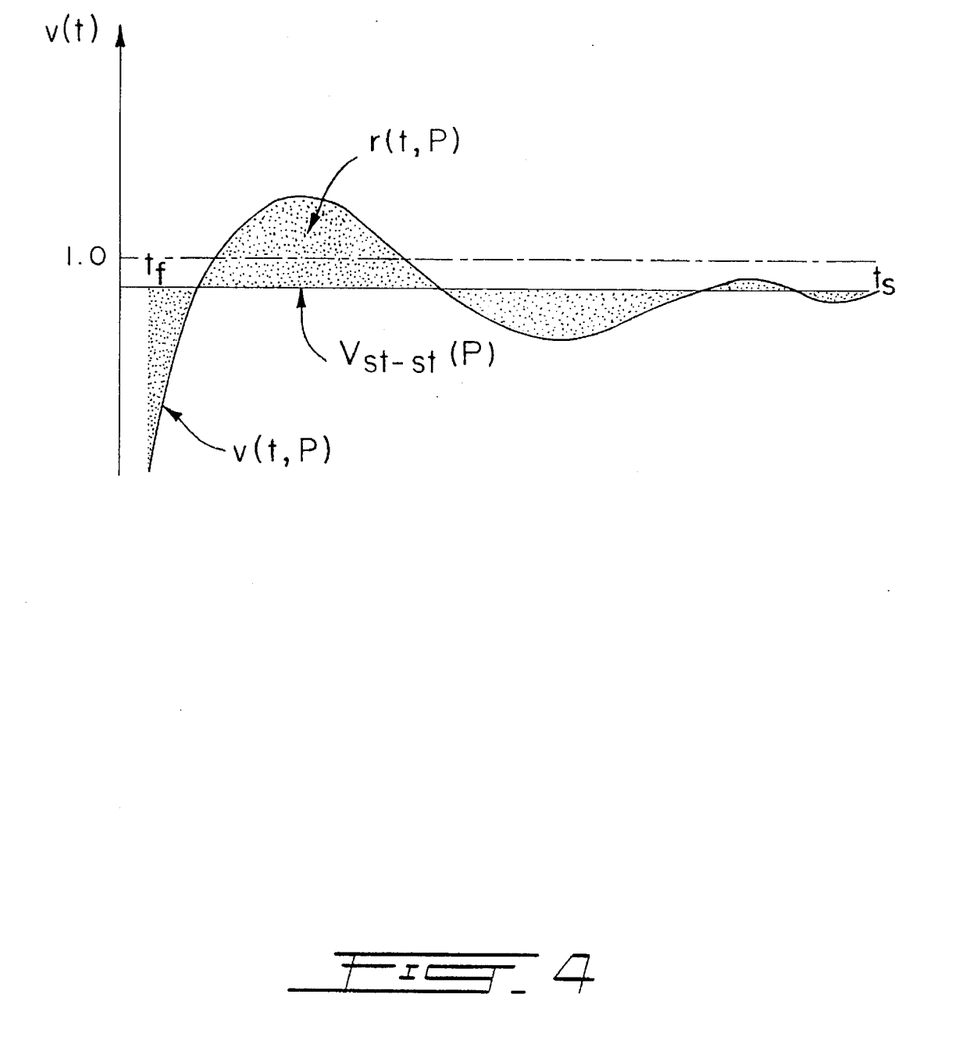
FIG. 4 illustrates the transient response signal energy calculation for all normal contingencies in which the post contingency steady-state voltage is dependent on generation P.

According to the preferred embodiment, the static values for passive conductive elements of the network are determined. These values are usually contained in a data base or file defining the characteristics of the network. Next, the steady-state values for the variable elements of the network are calculated based on given values for power transfer by the AC transmission lines. In the preferred embodiment, each contingency which is to be analyzed is simulated at two different power levels for the given AC transmission line which result in stability in the network. A steady-state voltage value for the post-contingency network is calculated for a given point in the network, namely at a given bus node. Then the voltage at that bus node is calculated over the course of the transient period from the beginning of the contingency to the stable steady-state condition. For each voltage value calculated over time, the steady-state value is subtracted and the value is squared. The sum of the squares is taken to obtain a signal energy value for the contingency as is illustrated in FIG. 4.

Figure 5:
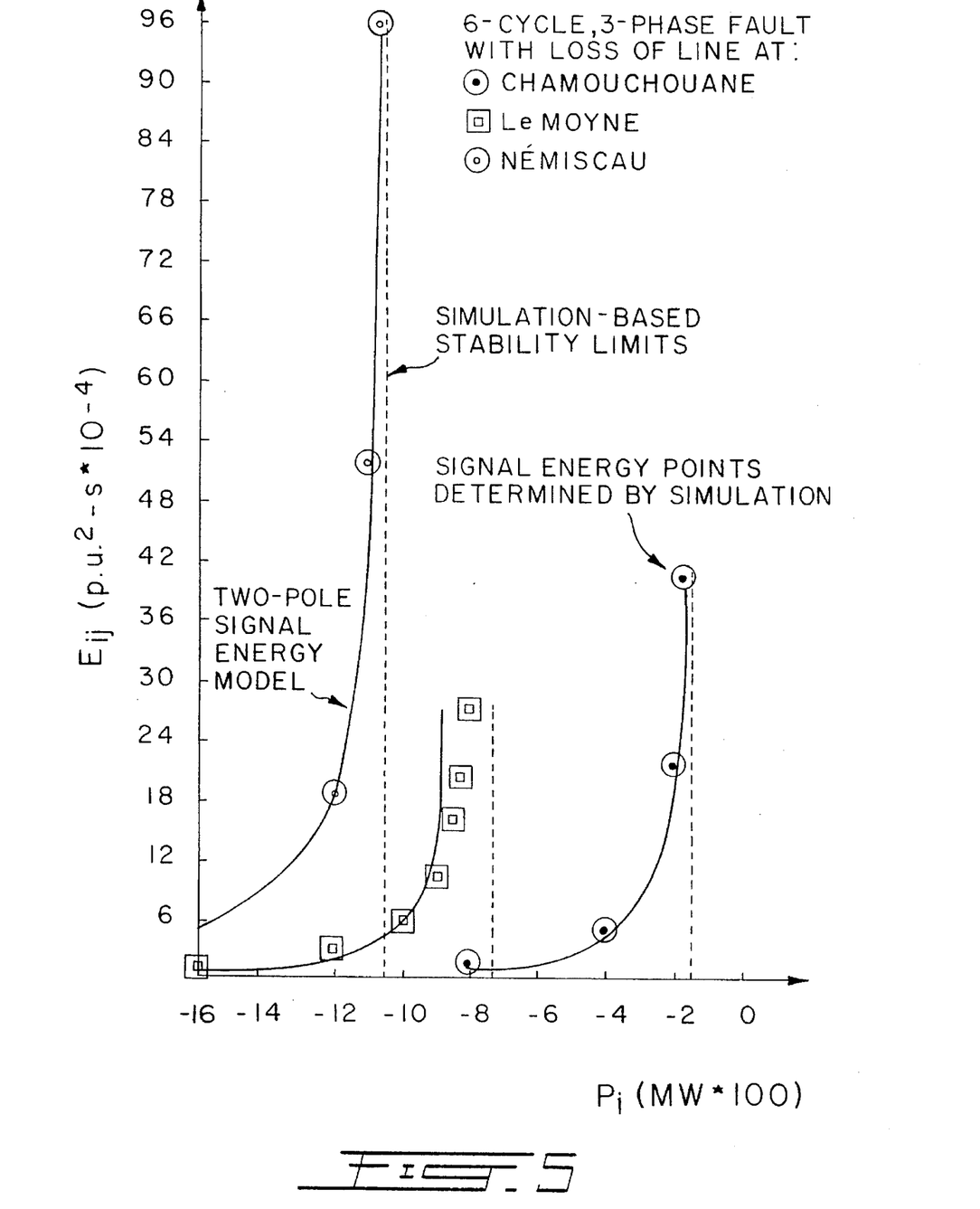
FIG. 5 illustrates the transient response signal energy behavior at different fault locations as a function of the combined generation of the LG 2, 3 and 4 generators with Pi given relative to a base case corresponding to 8830 MW for a six-cycle three-phase fault with loss of line.
Figure 6:
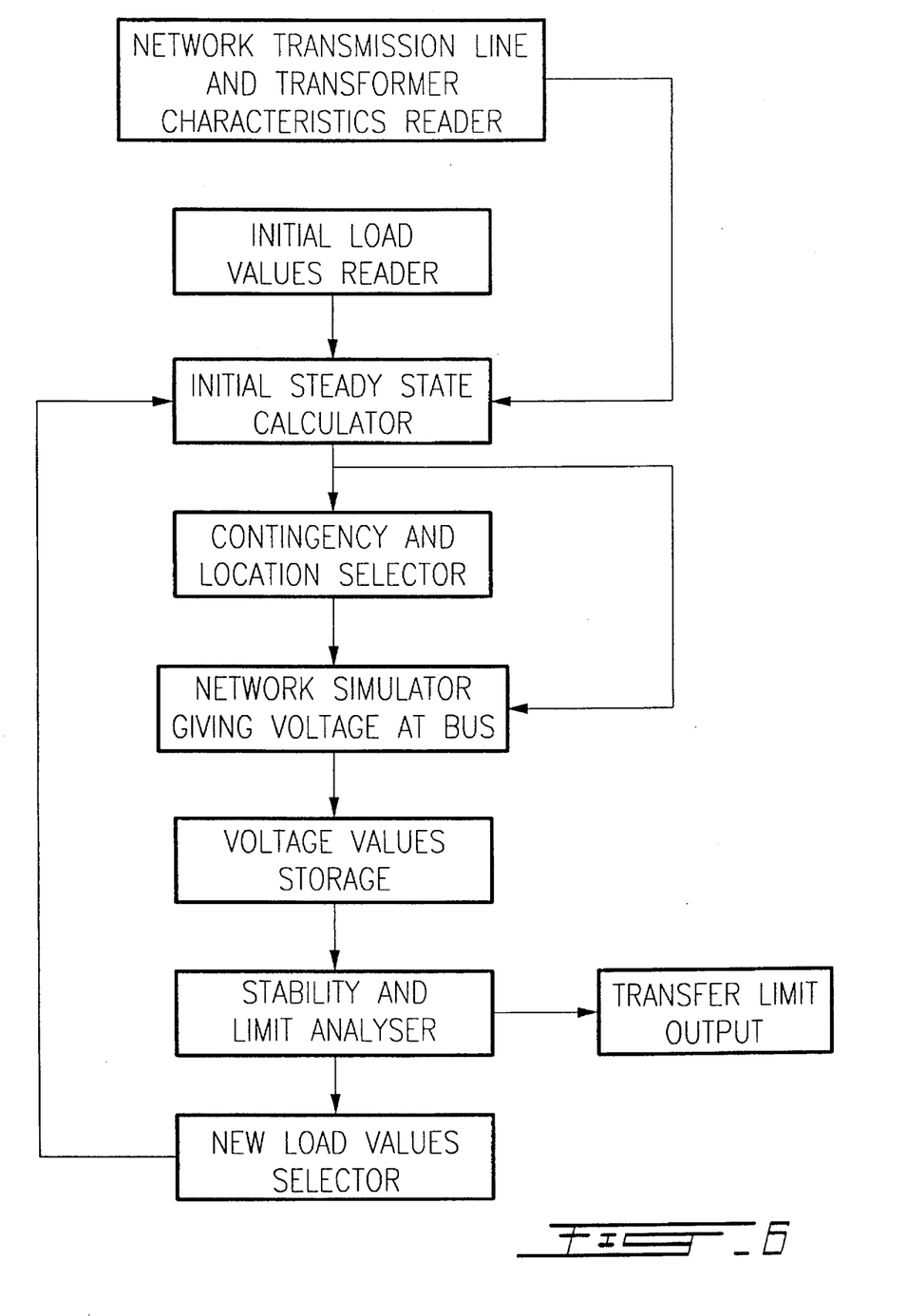
FIG. 6 is a block diagram illustrating the apparatus according to the invention.
Figure 7:
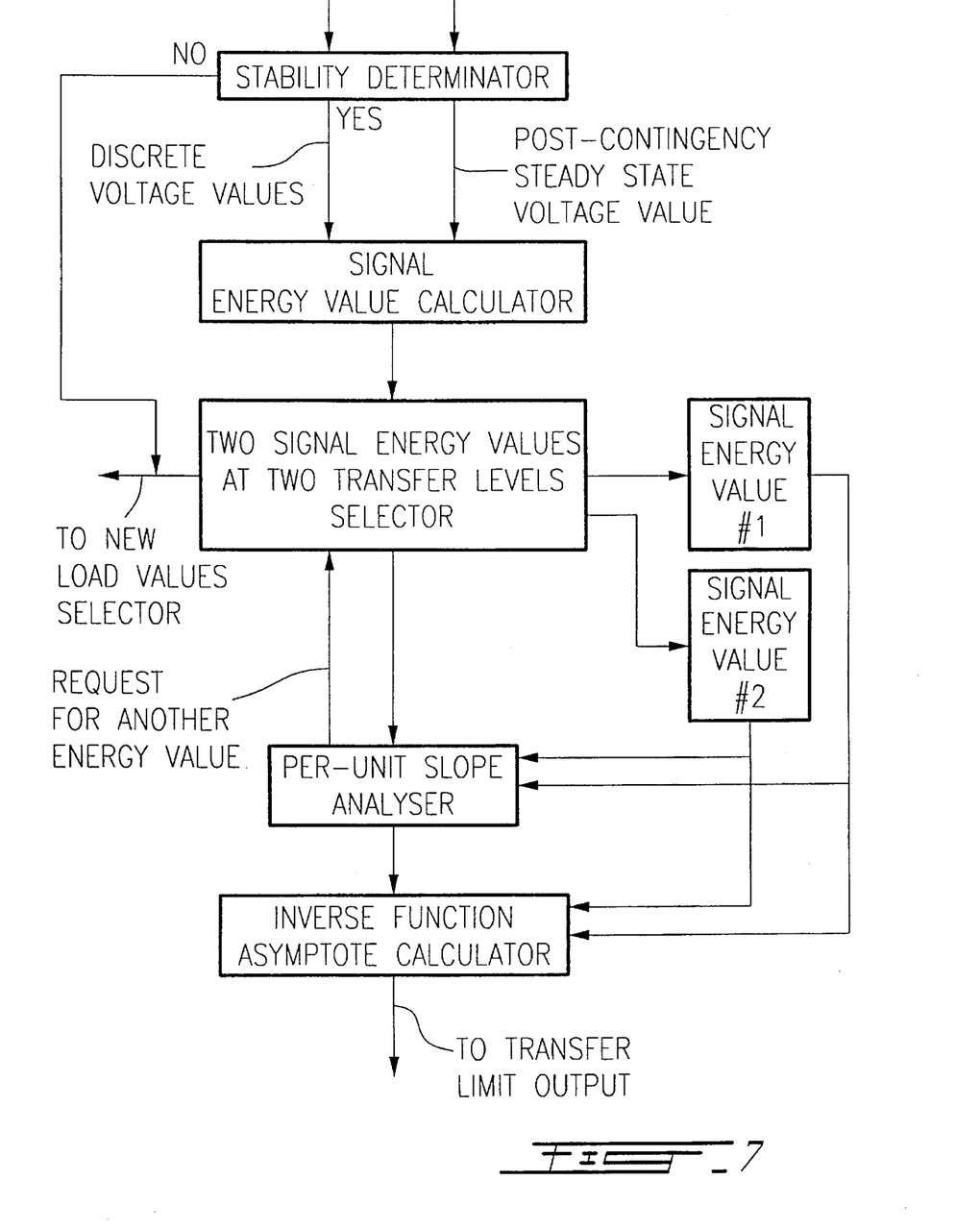
FIG. 7 is a block diagram illustrating the stability and limit analyzer according to the preferred embodiment.

It has been discovered that the signal energy values associated with a given normal contingency (i.e. a non-trivial contingency) at different power levels on a given transmission line within the network follow an inverse relationship of the transfer limit less each power transmission value for the given AC transmission line. Three examples of this function are illustrated in FIG. 5. Using only two points, the result of two simulations and energy value calculations, the inverse relationship is used to provide a prediction of the transfer limit. If the inverse relationship curve is drawn through two points which are well below the stability limit (i.e., between 80% and 90% of the limit), the accuracy of the prediction has been found to be lower. When the points chosen include a point relatively near the transfer limit (i.e. between 90% and 99% of the limit), the accuracy of the estimate is much higher.

According to the preferred embodiment, two energy values are obtained by carrying out two simulations at power levels which are presumed to be capable of yielding stability. If a per-unit energy slope of the two energy values is below a predetermined threshold, the two points, as would be seen on a plot as shown in FIG. 5, are at the beginning of the curve and would yield typically a less accurate estimate of the transfer limit. Therefore, a third simulation would be carried out using as the power value a value somewhat more conservative than the roughly estimated stability limit, and using the third energy value, the inverse function prediction is corrected to yield a new estimated transfer limit with greater accuracy.

The per-unit energy slope is calculated as follows:

$E_1$ = signal energy at $1^{st}$ power level point ($P_1$)
$E_2$ = signal energy at $2^{nd}$ power level point (P2)
L = estimated power transfer limit
We do as follows:

(i) calculate $$P_1' = \frac{P_1}{L}, P_2' = \frac{P_2}{L}$$

(i.e. per-unit power)
(ii) calculate $$E_1' = \frac{1}{1 - P_1'}, E_2' = \frac{1}{1 - P_2'}$$

(i.e. per-unit energy)
(iii) calculate the following slope: per-unit energy slope=

$$\frac{E_2' - E_1'}{P_2' - P_1'}$$

(iv) The value in (iii) must be greater than a predetermined value.

An intelligent limit search requires two fundamental elements:

(1) means to predict the next value of power at which the network is simulated, based on in-depth knowledge of the network's behaviour;

(2) an error-estimating strategy which enables one to stop the search when the error is within a known desired precision.

This preferred method embodies both of these elements and yields an accurate estimate of the transfer limit, usually within two or three stable simulations when the search is begun near full-load conditions. (Additional simulations may be required if the first two simulations were at power levels far below the transfer limit.)

In an alternative embodiment according to the present invention, the signal energy is not calculated to obtain a prediction of the stability limit, but rather transient voltage simulations are carried out iteratively until a maximum power transfer value is found at which the contingency does not prevent the transient voltage from reaching a stable steady-state terminal value.

As with both embodiments, the invention preferably provides a system for finding the transfer limit for each AC transmission corridor in a network or group of AC transmission lines. Once the transfer limit has been determined for each contingency in the group of AC transmission lines, the security limit for the group of AC transmission lines is taken as the lowest transfer limit of any contingency location within the group. This is so because the security limit is taken as the power level at which the network can operate and still undergo any contingency in the corridor without being unstable and requiring shutdown of the entire network.

We claim:

1. A method for calculating a transient stability or voltage stability transfer limit in a power network, said network having at least two independent AC generators supplying a common load via separate AC transmission lines having at least one bus, the method comprising the steps of:

a) determining steady state values for variable characteristic electrical parameters of variable elements of said network based on particular values for power transferred by said transmission lines;

b) determining static values for passive characteristic electrical parameters of passive conductive elements of said network;

c) selecting a contingency resulting in a sudden change of at least one of said variable electrical parameters and said passive electrical parameters;

d) calculating using said steady state and said static values a post contingency steady state value for a voltage at one of said at least one bus;

e) calculating using said steady state and said static values a voltage over time during a transition period at said one of said at least one bus, said transition period extending in time from a start of said contingency through a discontinuity during which said voltage at said one bus is abnormally altered, and recovery during which said voltage at said one bus will tend toward a steady state terminal value;

f) calculating an integral sum of squares of a difference between said post contingency steady state voltage and said transition period voltage over said transition period to obtain an energy value;

g) changing one of said power values associated with one of said AC transmission lines and repeating said steps a) b) d) e) and f) to obtain two said energy values, said two energy values being non-substantially-infinite;

h) obtaining a transfer limit estimate for said one transmission line as being an asymptote of said energy values, said energy values being an inverse function of said limit less said one power value.

2. The method as claimed in claim 1, further comprising steps of:

calculating a per-unit energy slope value as a function of said two energy values, said two corresponding power values and said limit estimate; and if said slope is determined to be below a predetermined value repeating said steps a) b) d) e) and f) using as said one power value a value near said obtained transfer limit to obtain a third energy value; and repeating step h) using additionally said third energy value to obtain a higher accuracy estimate of said transfer limit.

3. The method as claimed in claim 1, further comprising steps of:

repeating said steps a) b) d) e) and f) using as said one power value a value near said obtained transfer limit to obtain a third energy value; and repeating step h) using additionally said third energy value to obtain a higher accuracy estimate of said transfer limit.

4. Method as claimed in claim 1, wherein said contingency is a three phase fault resulting in loss of line in a given one of said AC transmission lines, and said transition period comprises subperiods of fault of said given one transmission line during which said given one transmission line provides a low resistance current path to ground, disjunction during which said given one line is disconnected from said group of transmission lines and said low resistance path is removed, and recovery during which said voltage at said one bus will oscillate toward a steady state terminal value.

5. Method as claimed in claim 4, further comprising steps of:

i) storing said transfer limit for said contingency;

j) changing said contingency to be of a different given one of a group of said AC transmission lines;

k) repeating steps a) b) d) e) f) g) and h); and l) repeating steps i) through k) to determine a lowest one of said transfer limits for said group, whereby said transfer limit for said group of AC transmission lines is taken to be the dynamic security limit.

6. A method for calculating a transient stability or voltage stability transfer limit in a power network, said network having at least two independent AC generators supplying a common load via separate AC transmission lines having at least one bus node, said method comprising the steps of:

a) determining steady state values for variable characteristic electrical parameters of elements of said network based on particular values for power transferred by one of said transmission lines;

b) determining static values for characteristic electrical parameters of passive conductive elements of said network;

c) selecting a contingency resulting in a sudden change of at least one of said variable electrical parameters and said passive electrical parameters;

d) calculating using said steady state and said static values a voltage over time during a transition period at one of said at least one bus, said transition period extending in time from a start of said contingency through a discontinuity during which said voltage at said one bus is abnormally altered, and recovery during which said voltage at said one bus node will oscillate toward a steady state terminal value; and e) changing one of said power values associated with said one of said transmission lines and repeating said steps a) and d) to determine within a predetermined degree of accuracy a maximum value for power generated at said one of said transmission lines resulting in a stable value of said terminal value, whereby said transfer limit is calculated to be said maximum value.

7. Method as claimed in claim 6, wherein one of said power values and a value of said common load are changed in step e), and a remainder of said power values remain constant.

8. Method as claimed in claim 6, wherein more than one of said power values are changed in step e), and said common load remains constant as said power values are changed.

9. Method as claimed in claim 6, wherein said contingency is a three phase fault resulting in loss of line in a given one of said AC transmission lines, and said transition period comprises subperiods of fault of said given one transmission line during which said given one transmission line provides a low resistance current path to ground, disjunction during which said given one line is disconnected from said group of transmission lines and said low resistance path is removed, and recovery during which said voltage at said one bus node will oscillate toward a steady state terminal value.

10. Method as claimed in claim 9, further comprising steps of:

f) storing said maximum value for said contingency;

g) changing said contingency to be of a different given one of a group of said AC transmission lines;

h) repeating steps d) and e); and i) repeating steps f) through h) to determine a lowest one of said maximum values for said group, whereby the dynamic security limit for said group of AC transmission lines is the lowest maximum stable power value.

11. An apparatus for calculating a stability transfer limit in a power network, said network having at least two independent AC generators supplying a common load via separate groups of AC transmission lines having at least one bus node, said apparatus comprising:

means for determining steady state values for variable characteristic electrical parameters of elements of said network based on particular values for power generated by said generators, and static values for characteristic electrical parameters of passive conductive elements of said network;

means for selecting a contingency resulting in a sudden change of at least one of said variable electrical parameters and said passive electrical parameters;

means receiving said steady state and said static values for calculating a voltage over time during a transition period at one of said at least one bus, said transition period extending in time from a start of said contingency through a discontinuity during which said voltage at said one bus is abnormally altered, and recovery during which said voltage at said one bus node will tend toward a steady state terminal value; and means for controlling said determining means and said calculating means to determine within a predetermined degree of accuracy a maximum value for power generated at one of said generators resulting in a stable value of said terminal value, whereby said transfer limit is said maximum value.

12. An apparatus for calculating a stability transfer limit in a power network, said network having at least two independent AC generators supplying a common load via separate groups of AC transmission lines having at least one bus node, said apparatus comprising:

means for determining steady state values for variable characteristic electrical parameters of elements of said network based on particular values for power generated by said generators, and static values for characteristic electrical parameters of passive conductive elements of said network;

means for selecting a contingency resulting in a sudden change of at least one of said variable electrical parameters and said passive electrical parameters;

means for calculating using said steady state and said static values a post contingency steady state value for a voltage at one of said at least one bus node;

means receiving said steady state and said static values for calculating a voltage over time during a transition period at one of said at least one bus, said transition period extending in time from a start of said contingency through a discontinuity during which said voltage at said one bus is abnormally altered, and recovery during which said voltage at said one bus node will tend toward a steady state terminal value;

means for calculating an integral sum of squares of a difference between said post contingency steady state voltage and said transition period voltage over said transition period to obtain a signal energy value;

means for selecting two said power values associated with one of said AC transmission lines and obtaining two non-substantially infinite energy values;

means for determining said transfer limit for said one transmission line as being an asymptote of said energy values, said energy values being an inverse function of said limit less said one power value.

* * * * *